United States Patent
Clare et al.

(10) Patent No.: US 6,561,731 B1
(45) Date of Patent: May 13, 2003

(54) PORTABLE IRRIGATION PIPE INSTALLATION AND REMOVAL SYSTEM

(75) Inventors: James Carter Clare, Escalon, CA (US); Michael Eugene Conrad, Stockton, CA (US); Stewart Bradley Brodie, Stockton, CA (US)

(73) Assignee: Golden State Irrigation Services, Stockton, CA (US)

( * ) Notice: Subject to any disclaimer, the term of this patent is extended or adjusted under 35 U.S.C. 154(b) by 0 days.

(21) Appl. No.: 09/521,804

(22) Filed: Mar. 9, 2000

Related U.S. Application Data
(60) Provisional application No. 60/124,387, filed on Mar. 15, 1999.

(51) Int. Cl.$^7$ .............................. F16L 1/00; E02B 11/02
(52) U.S. Cl. ................... 405/36; 405/154.1; 405/184.5; 414/745.4; 414/571; 29/237
(58) Field of Search .............. 405/154.1, 155, 405/184.4, 184.5, 36, 166, 167, 168.1–168.3, 170, 303; 414/745.1, 745.4, 745.5, 746.4, 746.7, 528, 537, 559, 571, 575, 584; 29/237, 426.1, 426.3, 890.14; 239/600, 726, 750, 734, 741, 742

(56) References Cited

U.S. PATENT DOCUMENTS

| | | | | |
|---|---|---|---|---|
| 2,704,162 A | * | 3/1955 | Johnson | 414/745.1 X |
| 3,034,668 A | * | 5/1962 | Wicks | 414/746.7 X |
| 3,561,613 A | * | 2/1971 | Moad | 414/745.6 X |

(List continued on next page.)

FOREIGN PATENT DOCUMENTS

| | | | | |
|---|---|---|---|---|
| DE | 3330654 | * | 3/1985 | 414/746.4 |
| DE | 3500206 | * | 7/1986 | 414/746.7 |

OTHER PUBLICATIONS

McCulloch et al, *Irrigation Handbook for Irrigation Engineers*, 1973, Lockwood–Ames.
Reynolds Metal Company, *Reynolds Aluminum Irrigation Pipe: The Quality line for any type of irrigation system*, 1980.
Fry et al., *Sprinkler Irrigation Handbook*, 1971, Rain Bird Sprinkler Mfg. Corporation.
Pair et al, *Sprinkler Irrigation*, 1975, Sprinkler Irrigation Association.
Anonymous Market Study, 1989.
Shearer et al. *Sprinkler Irrigation in the Pacific Northwest*, 1965, Pacific Northwest Cooperative Extension Publication.
Marsh et al, *Solid Set Sprinklers*, 1969, University of California Agricultural Extension Service.

*Primary Examiner*—Jong-Suk (James) Lee
(74) *Attorney, Agent, or Firm*—Michael A. Glenn; Kirk D. Wong

(57) ABSTRACT

A portable pipe irrigation system that is used primarily for temporary drip and sprinkler installations includes a unique trailer that comprises a platform which simplifies installation and removal of the irrigation system. The trailer is either self propelled or pulled by a tractor. A magazine in the central portion of the trailer is of a sufficient length to accommodate pipe of various lengths and cross sections. A work platform is located at either end of the magazine, allowing workers to manipulate the pipe in the magazine and load the pipe into one of two installation chutes. Catwalks are located on one or both sides of the magazine. Two chutes or channels are located on the platform at a comfortable work level. A primary chute is located closest to the magazine and is fitted with a fixed stop on the front end and a pushing lever on the rear end. A secondary chute is provided for final assembly of the pipe sections. The secondary chute has a lever of a much longer radius that travels along the length of the chute. The two chutes define work areas where the pipe sections are assembled or disassembled. At the rear of the trailer/platform are outriggers that assist in the accurate placement of pipe in the field.

5 Claims, 17 Drawing Sheets

U.S. PATENT DOCUMENTS

| | | | |
|---|---|---|---|
| 3,858,731 A | * | 1/1975 | Briggs ................. 414/746.7 X |
| 3,956,901 A | * | 5/1976 | Brown .................... 405/184.5 |
| 4,093,082 A | * | 6/1978 | Goodsell ................. 414/745.5 |
| 4,119,210 A | * | 10/1978 | Desourdy ............ 414/745.5 X |
| 4,135,738 A | | 1/1979 | Clements ....................... 285/5 |
| 4,553,900 A | | 11/1985 | Miller et al. |
| 4,897,910 A | | 2/1990 | Miller et al. .................... 426/3 |
| 5,511,826 A | | 4/1996 | Clare et al. ..................... 285/5 |
| 5,522,699 A | * | 6/1996 | Smith .................. 405/184.5 X |
| 6,273,643 B1 | * | 8/2001 | Baugh ........................ 405/166 |

* cited by examiner

PORTABLE IRRIGATION PIPE INSTALLATION AND REMOVAL SYSTEM

This application claims benefit of provisional application Ser. No. 60/124,387 filed Mar. 15, 1999.

BACKGROUND OF THE INVENTION

1. Technical Field

The invention relates to the irrigation of crops. More particularly, the invention relates to a portable irrigation system.

2. Description of the Prior Art

Sprinkler irrigation has over the years replaced many other forms of irrigation methods because it minimizes erosion, prevents many drainage problems, does not require land leveling, and generally provides a uniform application of moisture to irrigate crops on a variety of terrains and minimal management expertise.

Sprinkler irrigation systems are typically classified by the degree of their portability. For example, there are permanent systems, fully portable systems which can be moved from one field to another, and semi-portable systems which move through the field mechanically but are cumbersome to move to different locations.

Portable irrigation pipe has been an integral component of irrigation systems in the western United States for over fifty years. Portable piping used outside of agriculture for emergency response, waste water spray fields, dust control, and temporary pipelines provides an essential tool and solution for construction, public works, and pollution control.

Aluminum pipe having brass impact sprinklers for solid set irrigation is the dominant choice for overhead irrigation and seed germination in the western United States. Portable aluminum pipe is also used for drip main lines and surface irrigation systems. It is the common experience of those who use such state of the art irrigation systems that the systems are subject to damage and corrosion, and are unreliable, have less than reliable coupling devices, they leak, they commonly exhibit unsatisfactory sprinkler water distribution, have high labor and maintenance requirements throughout operation, and safety issues such as electrocution and back injuries are common. Further, portable aluminum pipe systems must be moved or removed by hand to facilitate the cultural operations which are common to farming, i.e. cultivating, fertilizing, spraying, bed shaping, planting, and harvesting.

One solution to the shortcomings of such portable irrigation systems is to provide aluminum or PVC mains to transport water and nutrients to a manifold system of small diameter pipe or hose and drip tubes (drip irrigation system). Drip systems by nature are best operated on a crop demand basis and require frequent matching of evapotranspiration. The frequency of irrigation with correct timing and a program of injecting nutrients results in conservation of water and fertilizer and typically excellent yields. Drip systems are difficult to design and install, subject to plugging, often do not germinate seeds well, require intensive management supervision and do not lend themselves to difficult terrain; they are expensive to install and disposal of thin wall drip tubing (which lasts from one to five years) is prohibited in certain areas and expensive.

One solution to the undesirable drain and leaky gasket problem (in the case of aluminum pipe) is the installation of a watertight gasket. However, the use of a watertight gasket creates a second, more serious problem. Aluminum pipe couplers are designed to drain at low pressure to enhance portability. Given that non drain gasket would no longer drain the water, fertilizer, acid, and chlorine combination that growers inject into the lines to disperse nutrients and to prevent clogging, there is a greater opportunity for such combination of chemicals to corrode the pipe.

One solution to the corrosion problem is to use a pipe and fittings made of anon-reactive material, such as PVC or polyethylene. There have been several attempts over the years to build portable systems from the materials over the years. While such system can be an improvement over previous systems because of the savings in water and greater reliability and service afforded by such system, the more reliable they are, the less portable they are. The more portable they are, the greater tendency to leak and come apart as plastic materials tend to shrink with cold and expand with heat.

Possible solution to the labor and handling problem would be to provide machinery or technique to move or install the aluminum pipe without field labor. Pipe and cable plows are commonly used to install underground lines (See FIGS. 1a and 1b). Pulled by a tractor, this "plow" puts a previously glued pipeline, cable or similar conduit at a fairly precise depth. A machine built by Wm. Miller Co. of Brawley, Calif. (U.S. Pat. Nos. 4,553,900 and 4,897,910) is available to pull pipe out of the field joint by joint. This machine is not capable of installing pipe and works with a limited number of aluminum coupling styles. Techniques have been tried and proven such that aluminum pipe is dragged linearly from field to field. This technique is utilized exclusively when fields or pipe positions are in a straight line relative to the next position. Aluminum pipelines (laterals) can only bend 5° per 30 or 40 foot section and are rigid. Shifting and mechanization techniques for aluminum pipe has been tried and failed as the pipe and joints are inflexible or come apart from the rigors of mechanical handling.

One possible solution to the labor, handling, leaking, flexibility problem; is to provide non-metallic sprinkler laterals with no coupling device (i.e. hose). There are systems of this type. Polyethylene and rubber hoses equipped with sprinkler outlets are commonly used outside of the United States on small fields and occasionally in the U.S. In the western United States a common length of sprinkler lateral is 1320' (¼ mile) and sprinklers generally operate at 45 to 70 psi. the minimum diameter of pipe to accommodate the flows required to operate sprinklers for this length of run is generally accepted to be 3". Hose, of rubber or polyethylene, in order to handle the pressure must have considerable wall thickness and is therefore, very heavy (2 lbs per foot for poly vs. 0.5 lbs. per foot for aluminum). Rubber hoses have proven prohibitively. Reels of hoses 2" diameter or greater are difficult to handle and transport.

It therefore, would be advantageous to provide an irrigation system which exhibited the portability of aluminum pipe, the integrity of a hose, the application and uniformity of "rain on demand", the durability of modern plastic material, the multiple irrigation capability of a drip system, and finally a system which would allow multiple operations in the field and be installed and removed mechanically.

SUMMARY OF THE INVENTION

The invention provides a portable pipe irrigation system that is used primarily for temporary drip and sprinkler installations. The portable installation system includes a unique trailer that comprises a movable platform which simplifies installation and removal of the irrigation system. The trailer/work station is either self propelled or pulled by a tractor. A central portion of the trailer/work station is of a sufficient length to accommodate pipe of various lengths and cross sections, e.g. pipes that are 20, 30, or 40 feet in length. The width of the trailer is typically from six to twelve feet. The axles of the trailer can be independently operated such that the trailer can make tight turns, therefore the rear axle is capable of maintaining direction while the front axle turns, when the rear axle reaches turning point it is operated independently.

The central portion of the trailer/work station is referred to herein as the magazine. A work platform is located at either end of the magazine. These platforms allow workers to manipulate the pipe in the magazine and load the pipe into one of three installation chutes. The platforms also serve to store previously staged piping components.

Catwalks are located on one or both sides of the magazine. If pipe is being installed from one side of the magazine, then only one catwalk is provided; if pipe is being installed from both sides of the magazine, then two catwalks are provided. The catwalks allow workers to walk safely and freely along the side of the magazine.

The workers are responsible for assembling the pipe sections and placing them in position to be installed in the field (or to disassemble the pipe when it is removed from the field).

Three chutes or channels are located on either side of the platform at a comfortable work level, e.g. about waist level. Two chutes have moving belts to orient the pipe for assembly. The chutes or channels extend the length of the platform. A primary chute is located closest to the magazine and is fitted with a fixed stop on the front end and a pushing lever on the rear end. The second chute is filled with a rubberized belt which moves toward the from of the trailer/work station. The third chute has a belt which travels to the rear of the trailer and is equipped with tools to facilitate final assembly of the sprinkler catwalk. The three chutes define work areas where the pipe sections are assembled and disassembled. Oriented above the third chute and belt is a pneumatically or hydraulically operated plunger/press when activated pushes the pipe tight against the belt and therefore increases the speed of the pipe and facilitates the joining of the previously assembled pipe and the new joints.

At the rear of the trailer/platform are outriggers that assist in the accurate placement of pipe in the field.

DETAILED DESCRIPTION OF THE INVENTION

Figure 1A:
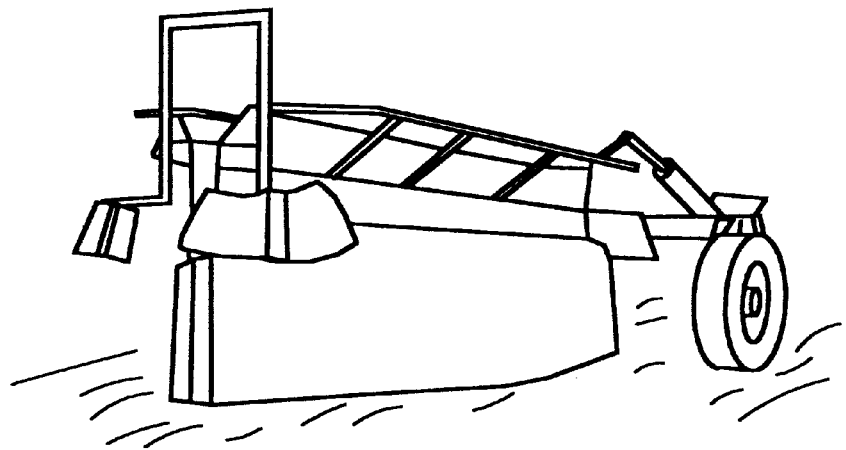
FIGS. 1a and 1b show the existing technology of a pipe plow.
Figure 1B:
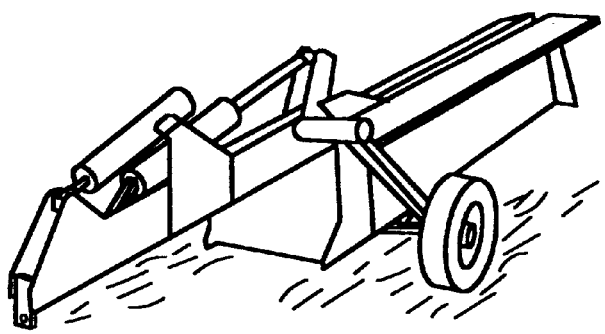
Figure 2:
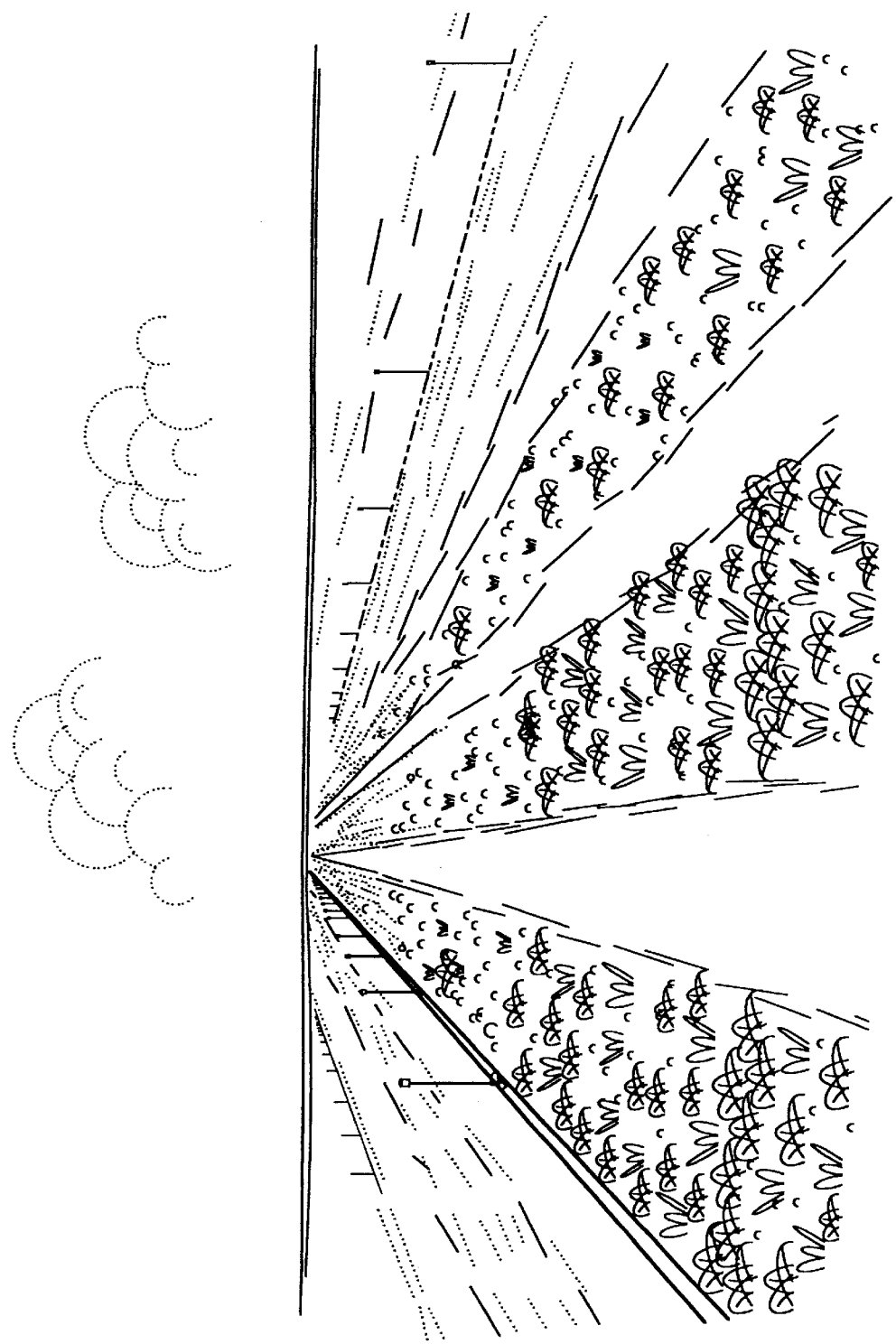
FIG. 2 is an illustration of the grid and layout of a "sold set system" for sprinkler irrigation.
Figure 3:
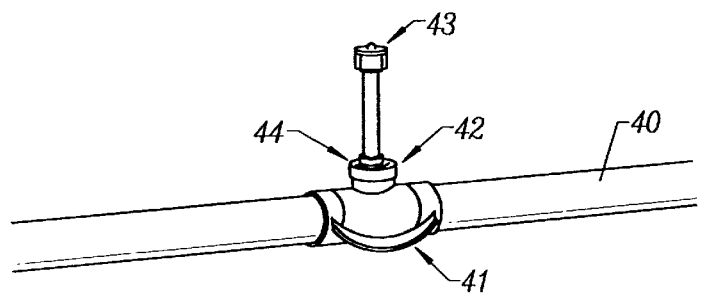
FIG. 3 are two illustrations featuring the components of the Golden 2000 system.
Figure 3:
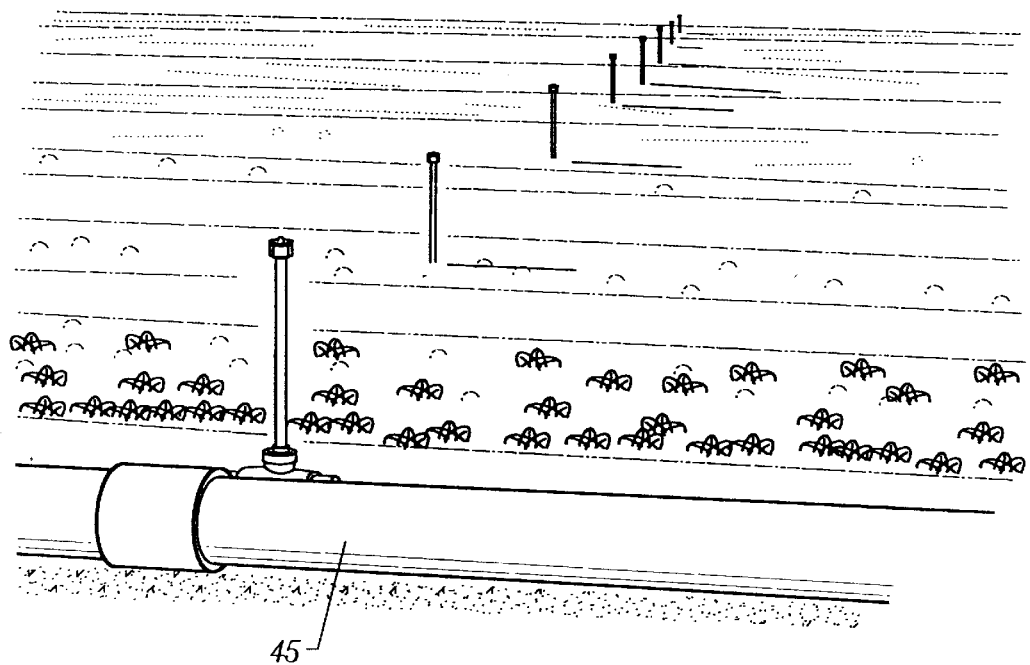
Figure 4:
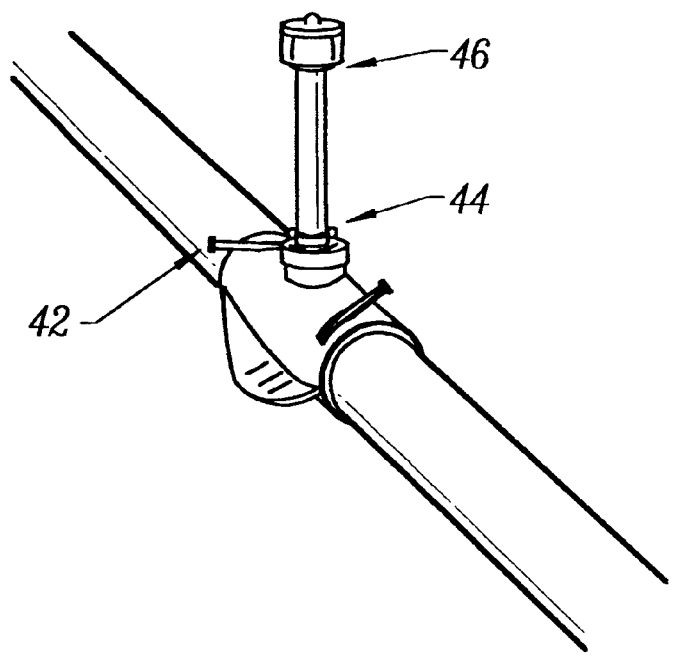
FIG. 4 illustrates the quick coupling features of the Golden 2000 system.
Figure 5:
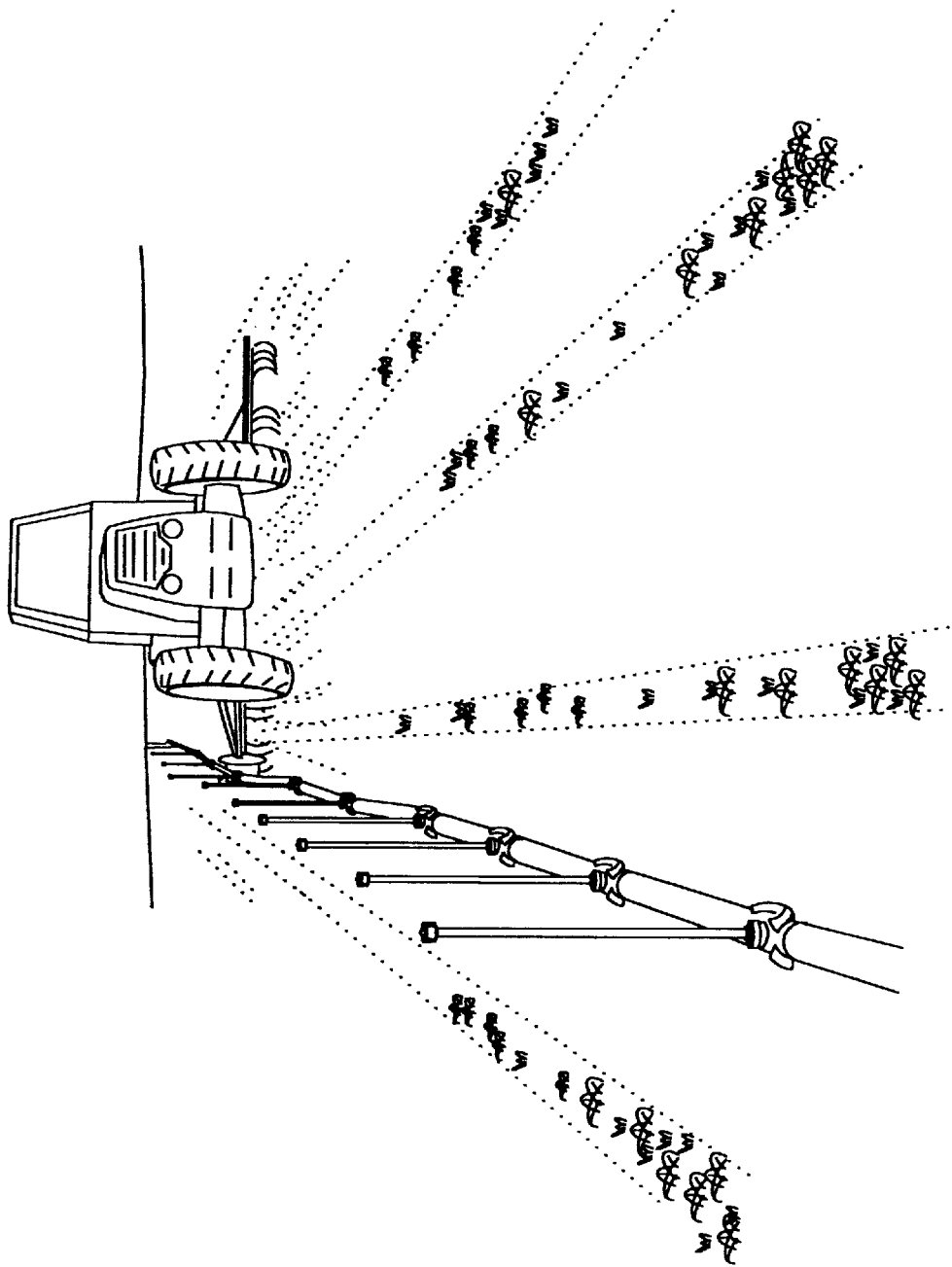
FIGS. 5 and 6 illustrate the mechanical adaptability of the Golden 2000 system.
Figure 6:
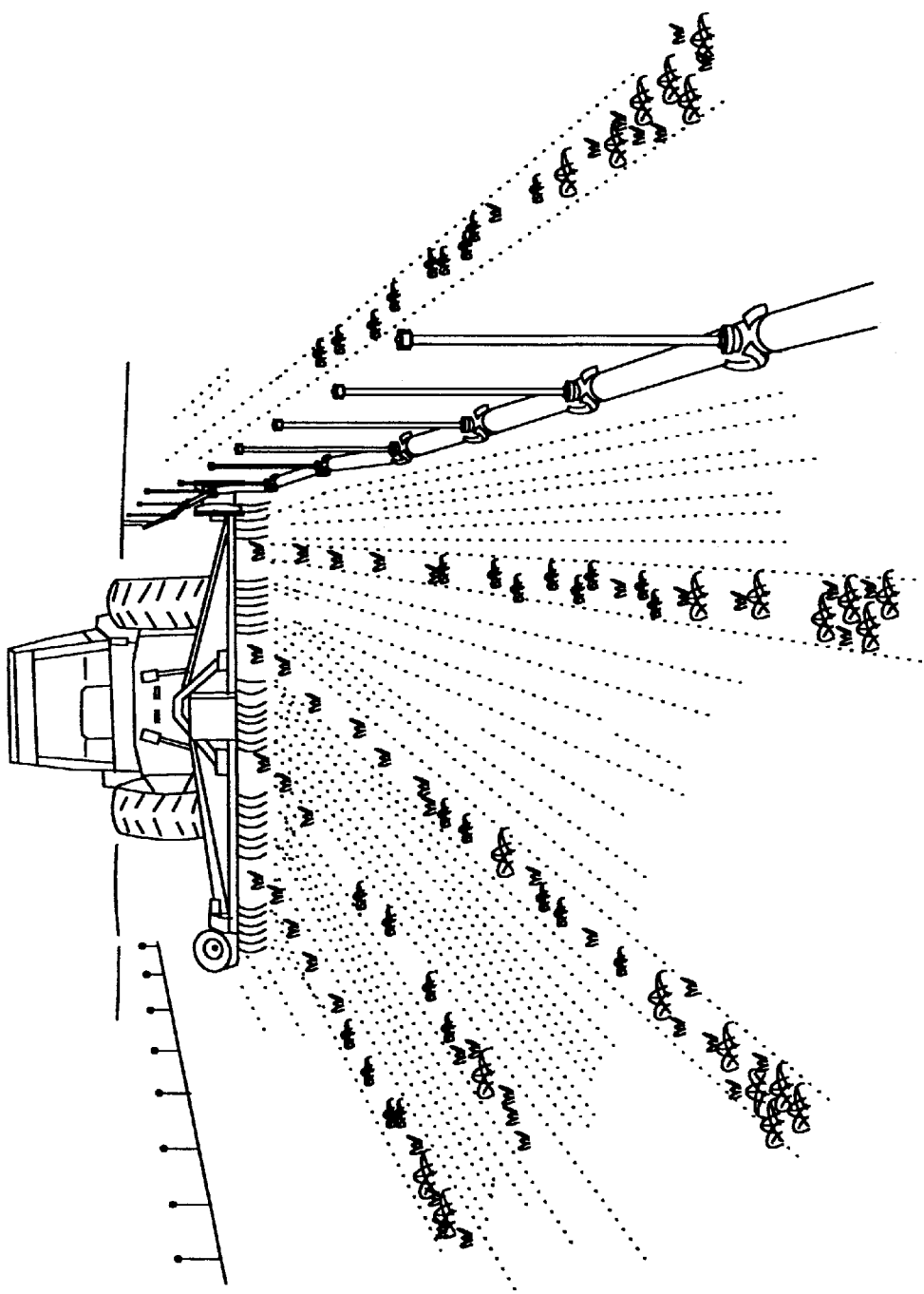

The invention provides a portable pipe irrigation system that is used primarily for temporary sprinkler installations.
The Irrigation System The invention provides a portable irrigation system that is designed and constructed to be installed, removed and manipulated mechanically and simulate the effect of rain in a manner which most closely resembles "instant rain" and that does not exhibit the deficiencies associated with pressurization and de-pressurization of typical irrigation equipment. Thus, in a sprinkler installation system made in accordance with the invention the joints do not leak, the sprinklers shut off immediately, the sprinklers turn on immediately, and the assembled laterals can be moved vertically or horizontally without damaging or disassembling the system. The assembled pipe section exhibits the flexibility and integrity of a hose while breaking down into relatively small rigid units.

Installation of the portable irrigation system is accomplished mechanically. As discussed above, workers install the equipment which comprises the sprinkler installation system from a moving platform or portable work station, thereby eliminating the need of walking through the field that is to be irrigated. Removal of the sprinkler installation system is also mechanically assisted. The irrigation system is readily stored on pallets when not in use, and is thus readily transported.

One important aspect of any irrigation system that is used in connection with the invention is the reliability of the joints within the system. This allows the irrigation system fitted with valves and control mechanism to be set up on a timer, thereby automating the irrigation process. This aspect of the invention also allows the use of efficient chemigation. That is, the non-leak joints of the irrigation system allow ready pressurization and de-pressurization of the system. This arrangement provides outstanding overhead irrigation uniformity, thus giving the farmer the opportunity to apply pesticides and nutrients uniformly and without waste. The invention also improves the delivery of water and/or chemicals, such that the water and/or chemicals are conserved.

The construction of the portable irrigation system is such that a more durable and therefore more reliable system, having a longer service life, is provided. The system is constructed in such fashion and from such materials as to be resistant to corrosion that might result from the use of various chemicals. The system is such that it may be readily adapted for surge and pulse type delivery.

The components of the irrigation system include a PVC pipe that resists UV degradation and that has both high ductility and high chemical resistance. The joints are gasketed to prevent leaks at 0 to 125 pounds pressure. The various pipes that comprise the irrigation system include unique coupling devices that allow rapid breakdown and packaging of the system. The use of non-metallic (plastic) components for both the piping and the couplers offers exceptional availability (the small amount of aluminum and stainless steel are of alloys which do not corrode). The couplers feature a poly-lock mechanism which prevents separation when the irrigation system is in operation. A sprinkler is provided that includes a reactionary drive mechanism. The sprinklers are coupled to the piping with quick coupling risers which are water tight.

While the invention has been described above in connection with PVC pipe and couplers, those skilled in the art will appreciate that other materials can be used to practice the invention. For example, the invention may be practiced with aluminum or polyethelene tubing, and with stainless steel and/or polyethelene or nylon fittings.

Exemplary Components of the Presently Preferred Irrigation System

The irrigation system is designed for rapid breakdown, portability mechanization. The constituent components of the invention are described in general terms below and in detail in FIGS. 2 thru 6 attached. A commercially available irrigation system that may be adapted for use in practicing the invention is the Golden 2000 system, assembled by Golden State Irrigation Services of Stockton, Calif.

The tubing is preferably a smooth, non-metallic, flexible material (FIG. 3—40). The tubing should be able to be bent to almost 90° without breaking or kinking. The tubing should be resistant to chemical damage, resistant to incidental traffic damage, and strong enough to accommodate mechanical handing. In the preferred embodiment of the invention, a square groove is located at each end of each tube. One tubing that may be used in connection with the invention is the Yelomine™ Certa-Lok™ PVC irrigation piping system, manufactured by the Certain Teed Corporation, Pipe and Plastics Group, Valley Forge, Pa.

The tubing coupler (FIG. 3—41) is preferably manufactured of a non-metallic material. The inside diameter of the coupler accepts the outside diameter of the tubing. The coupler has grooves on the inside at each end. One of these grooves is for a gasket and the other groove accommodates a locking device (FIG. 3—42). The bottom of the coupler has a stabilizer/skid and the top of the coupler is equipped with an orifice/gasket assembly (FIG. 3—44) that accepts, for example, a one-half inch or three-quarter inch tube, which serves as a sprinkler riser. This element of the coupler is referred to herein as the riser coupler. The coupler is designed and manufactured to withstand side stresses and bending associated with mechanical assembly, disassembly, pulling, and shifting during installation and removal of the system described herein. The seals, e.g. O-rings and/or gaskets, seal at pressures in the range of, for example, 0–125 PSI. One tubing coupler that may be used in connection with the invention is the Certa-Sert™ spline, manufactured by the Certain Teed Corporation, Pipe and Plastics Group, Valley Forge, Pa. or the Golden Spline manufactured by Olson Irrigation of Santee, Calif.

The locking device (FIG. 3—42) for the pipe coupler has a square cross section and is of a length such that it wraps around the pipe as it is inserted through the coupler and engages the pipe. The locking device is made of a non-metallic material and is flexible. The square design is such that its edges mate with the corresponding edges of the groove in the pipe and the groove in the coupler. This design allows manipulation of the pipe/coupler locking device. Other embodiments of the invention, e.g. those having a round cross section, allow the placement of a bind on the device, or allow overriding the device completely. One locking device that may be used in connection with the invention is the Yelomine™ Certa-Lok™ restrained joint, manufactured by the Certain Teed Corporation, Pipe and Plastics Group, Valley Forge, Pa.

The riser assembly (FIG. 3—44), i.e. the connection from the coupler to the sprinkler, is manufactured, for example, as a one-quarter inch, three-eighth inch, one-half inch, three-quarter inch, or one-inch tube of metallic or non-metallic material. On the bottom of the tube there is a locking device which is compatible with the coupler above. The top of the riser tube is fitted with a thread connection that is compatible with a sprinkler mechanism (FIG. 3—42).

A pressure regulating check valve device is installed in specialized applications as a variation to the primary system. This device is installed on the top of the riser between the riser and the sprinkler. This device regulates the pressure to a constant and a pre-determined value so that each sprinkler in the system operates at the same pressure. The device opens at a predetermined pressure and closes when system pressure drops below this predetermined pressure (or another, lower predetermined pressure in alternate embodiments of the invention). When this device is included in the system, all sprinklers operate in a similar manner. That is, the sprinklers do not open until an optimal pressure is applied to them all, and all of the sprinklers close when the pressure drops. One pressure regulating check valve is manufactured by Nelson Irrigation Corporation of Walla Walla, Wash.

The sprinkler or emission device in the preferred embodiment of the invention is a reactionary drive sprinkler (i.e. a non-impact sprinkler) having a unique radius and distribution capability. The sprinkler installation system is preferably designed for quick removal and optimal performance. The sprinkler is preferably made of non-metallic parts. One sprinkler device that may be used in connection with the invention is the Nelson GR2000 Rotator, manufactured by Nelson Irrigation corporation of Walla Walla, Wash.

The valves provide a connection from a water and/or chemical source, or main-line, to the sprinkler device via the coupler and tube assembly. The valve assembly is equipped with seals and/or coupling devices, which are non-leak and which can be manually operated or automatically operated.

The Preferred Sprinkler Installation System

Figure 7:
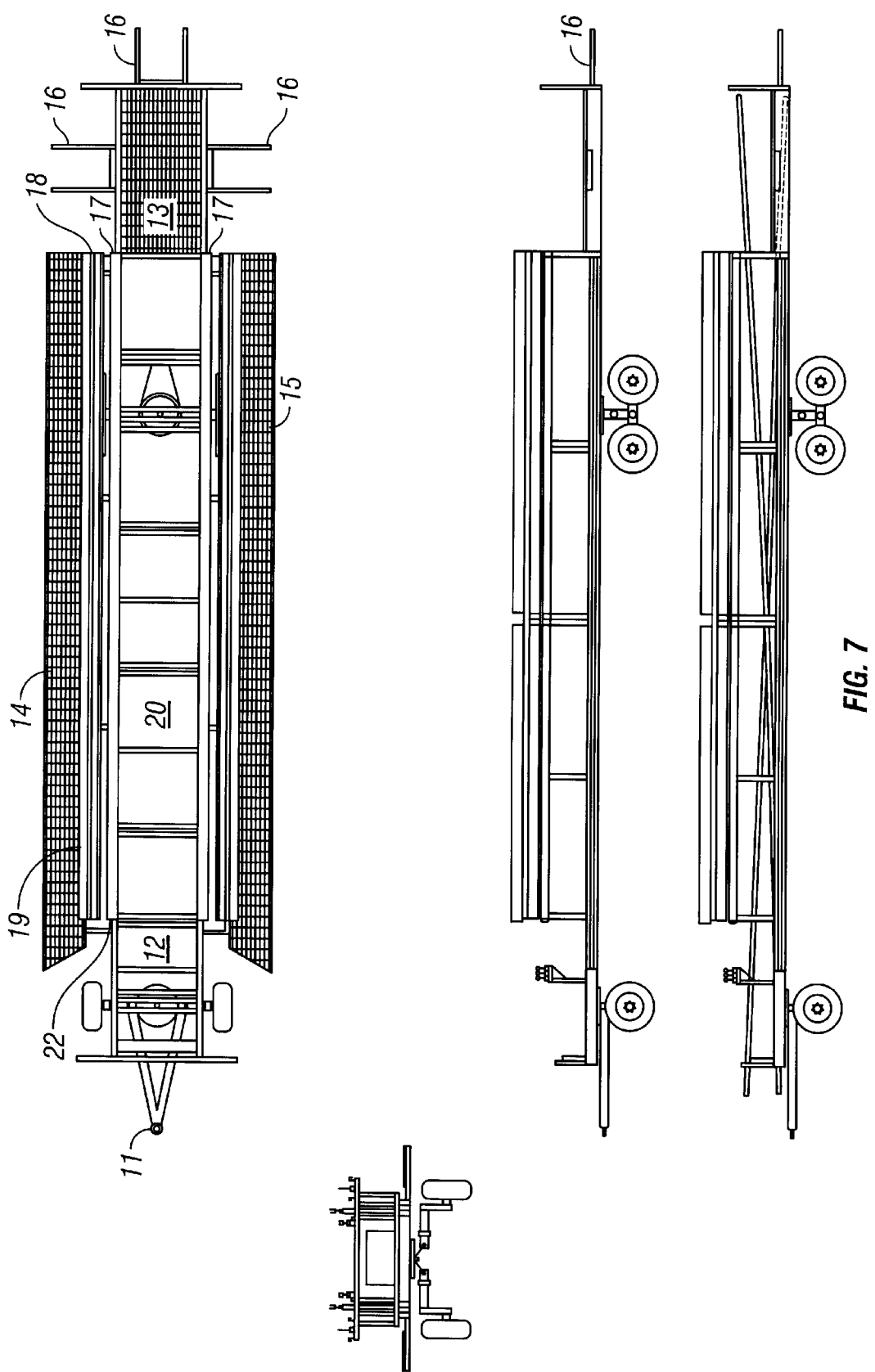
FIG. 7 are side, top and end view plan of the installation trailer/work station.

FIG. 7 is a top side and end plan view of a sprinkler installation system 10 according to the invention. The portable installation system includes a unique trailer that comprises a movable platform which simplifies installation and removal of the irrigation system. The trailer is either self propelled or pulled by a tractor, e.g. via trailer hitch 11. The platform rests upon a dual axle, wheeled chassis, such that it is readily moved through a field during a sprinkler installation or removal procedure. The front 34 axle turns independently of the rear 35, either axle can be oriented mechanically or hydraulically. A central portion of the trailer is of a sufficient length to accommodate pipe of various lengths and cross sections, e.g. pipes that are 20, 30, or 40 feet in length. The width of the trailer is typically from six to twelve feet. The trailer is typically made of tubular and/or sheet metal pieces that are welded, bolted, otherwise fastened together. The actual construction of the trailer is readily accomplished by those skilled in the art.

The central portion of the trailer is referred to herein as the magazine 20. A work platform 12, 13 is located at either end of the magazine. These platforms allow workers to manipulate the pipe in the magazine and load the pipe into installation chutes 17. The platforms also serve to store previously staged piping components.

Catwalks 14, 15 are located on one or both sides of the magazine. If pipe is being installed from one side of the magazine, then only one catwalk is provided; if pipe is being installed from both sides of the magazine, then two catwalks are provided. The catwalks allow workers to walk safely and freely along the side of the magazine.

The workers are responsible for assembling the pipe sections and placing them in position to be installed in the field (or to disassemble the pipe when it is removed from the field). Outriggers 16 at the rear portion of the trailer assist the workers in the accurate placement of the pipe in the field.

Three chutes or channels are located on either side of the platform at a comfortable work level, e.g. about waist level. The chutes or channels extend the length of the platform. A primary chute 17 is located closest to the magazine. A primary chute is located closest to the magazine and is fitted with a fixed stop 22 on the front end. A secondary chute 18 is provided with a forward moving belt, or conveyer 26 which moves the pipe forward to a position where it can be joined to the previously installed pipe which is now part of a pipe line of sprinkler lateral. The third of final assembly chute 19 has a rear moving, or conveyer belt 27 moving at a speed such that when the pipe to be installed is loaded onto this belt it achieves a velocity greater than the previously installed pipe and therefore rams itself into the coupler of the previously installed pipe. This process is assured by the use of a pneumatic press 28 which pushes the pipe against this belt 27. These three chutes define the work areas where the pipe sections are assembled or disassembled.

Figure 8:
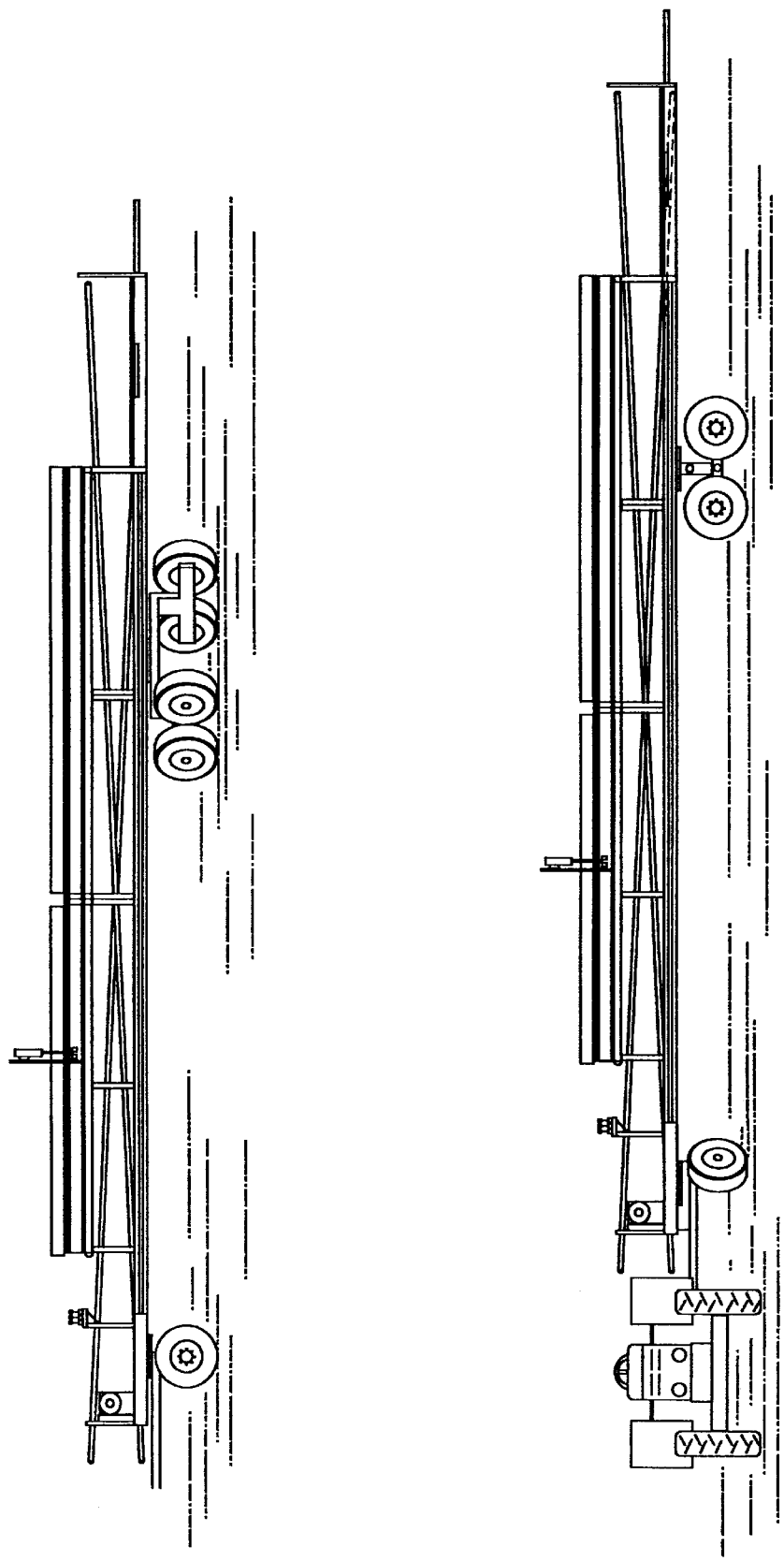
FIG. 8 is a side perspectives of the of the installation trailer/work station.

FIG. 8 is a side view perspective of the sprinkler installation system according to the invention. FIG. 8 shows the system and workers in the process of turning at the end of the field.

Figure 9:
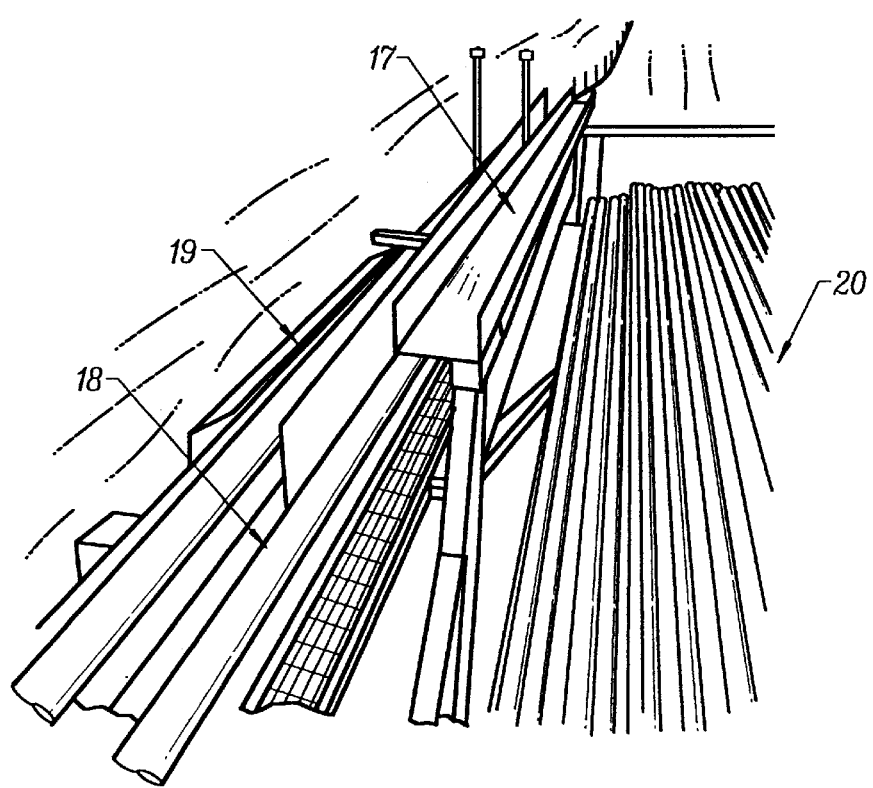
FIG. 9 is a front to back and perspective of one side of the trailer/work station.

FIG. 9 shows the orientation of chutes 17, 18 and 19 as wells as magazine 20. FIG. 9 shows a pipe in the secondary chute 18 moving forward and previously installed pipe in the third chute 19 moving out into the field, the assembler picture is AR.

Figure 10:
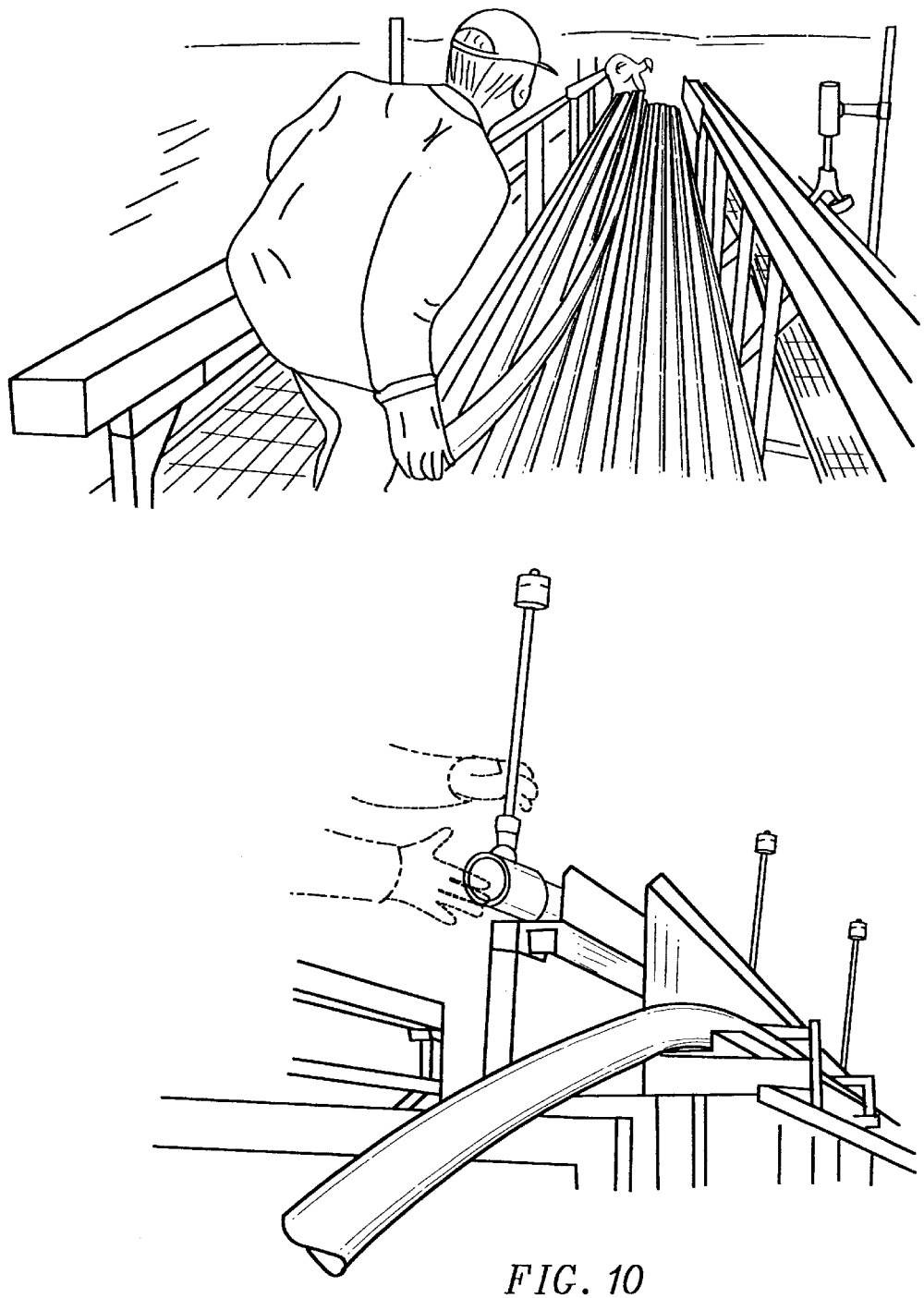
FIG. 10 are front and rear end perspectives of the trailer/work station showing personnel required for single line installation (tractor driver not shown).

FIG. 10 (top) shows assemblers AF and AR loading a pipe into the primary chute 17. FIG. 10 (bottom) shows assembler AR pushing a coupler onto the pipe prior to loading into the secondary chute. FIG. 10 (bottom) shows the sprinkler portion of a pipe in the secondary chute moving forward and a installer coupled pipe moving into the field.

Figure 11:
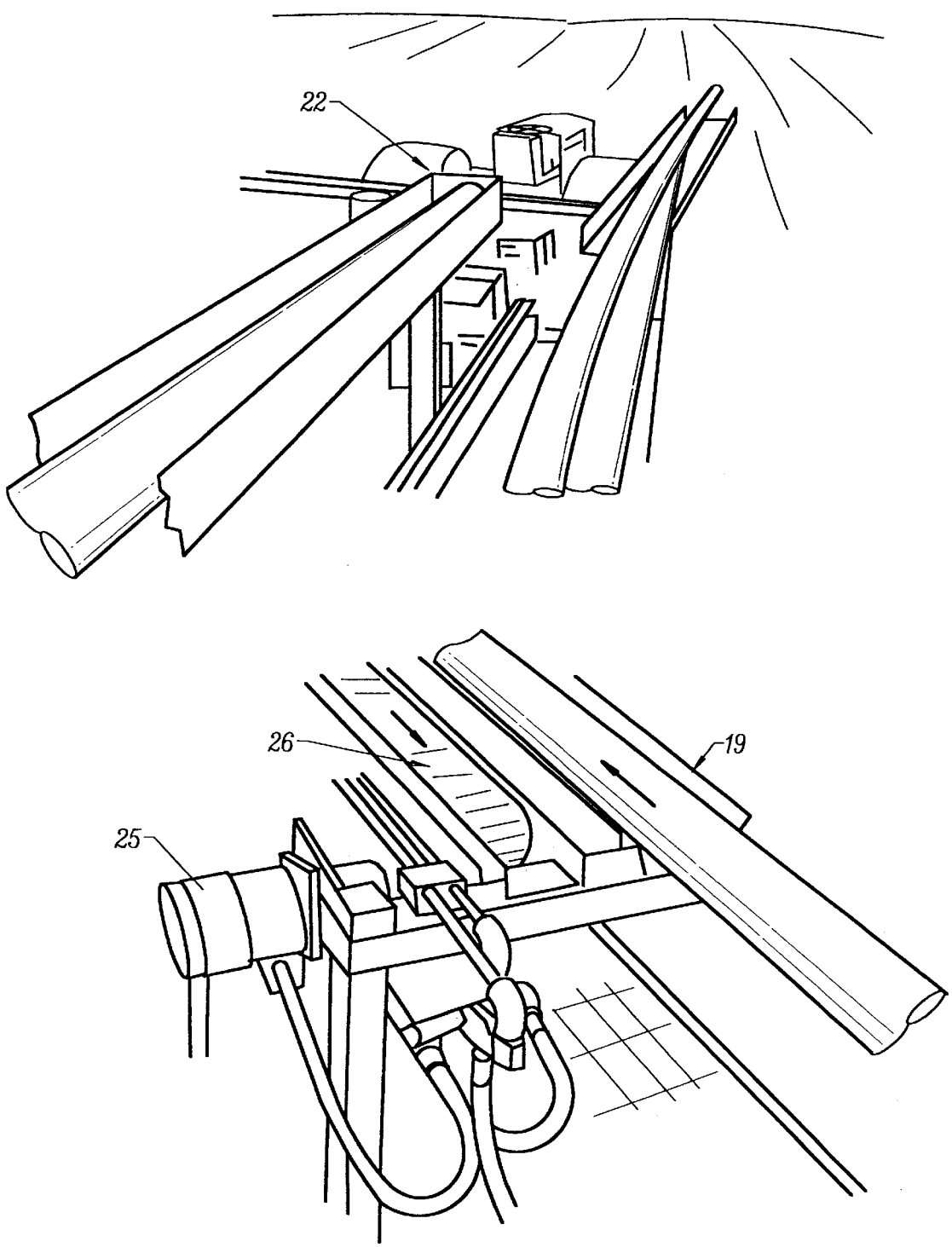
FIG. 11 shows belts, motors and mechanical assists which aid pipe and assembly.

FIG. 11 (top) shows assembler AF positioning a pipe against stop 22. FIG. 11 (bottom) illustrates belt 26 and chute 3, 19 FIG. 11 (bottom) also illustrates a hydraulic motor 25 which powers one belt.

Figure 12:
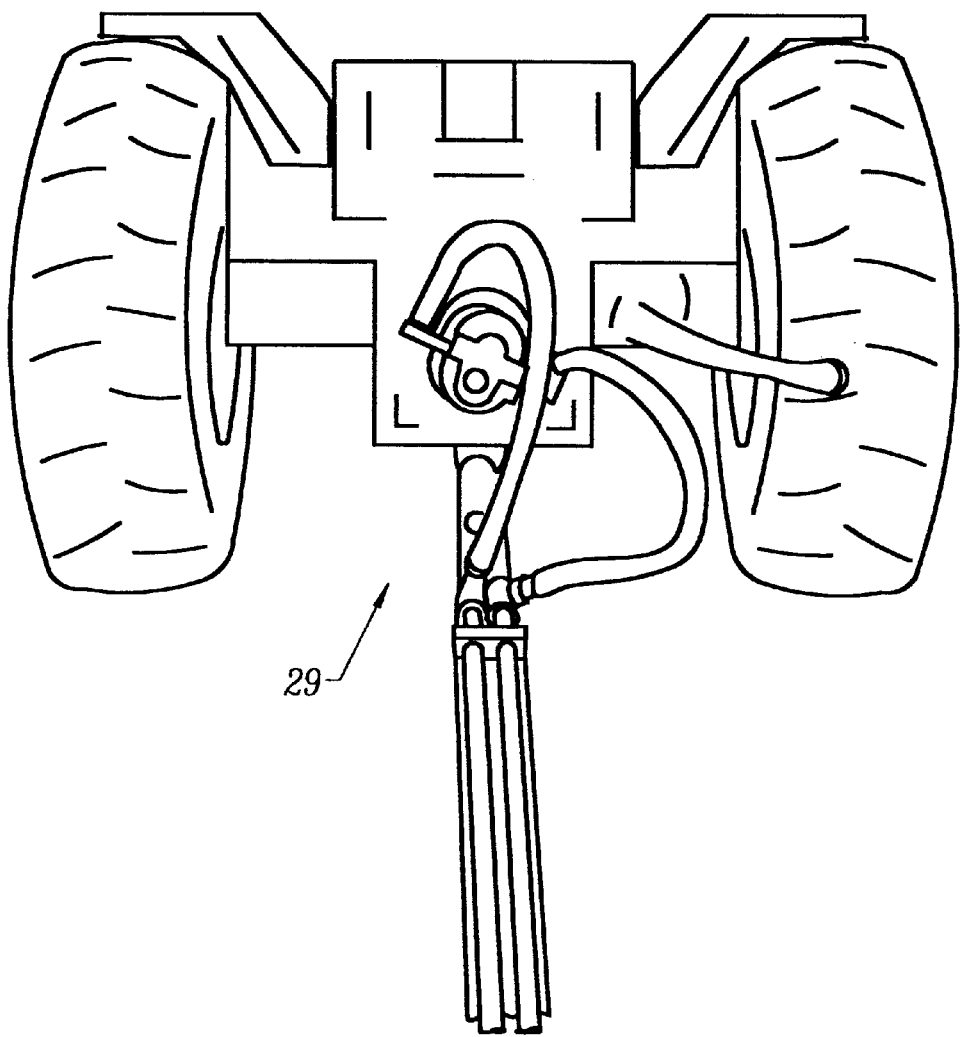
FIG. 12 illustrates position of tractor-mounted hydraulic pump.

FIG. 12 depicts the trailer hitch 11 and a tractor power hydraulic pump 29.

Figure 13:
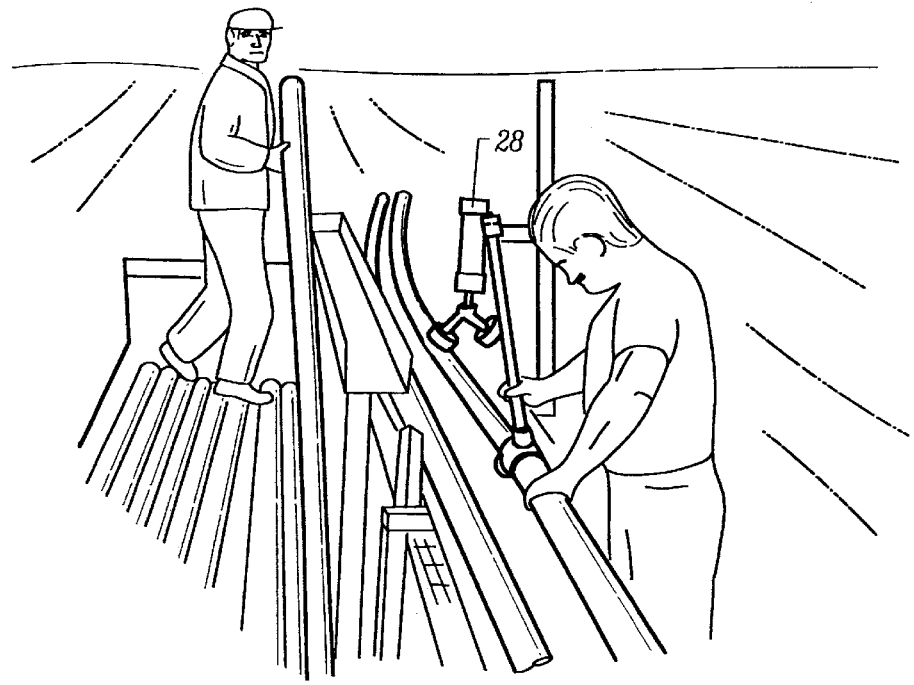
FIG. 13 illustrates position of Rear Assembly (AR) Front Assembly (AF) and Right Side Installer (RSI) from a side perspective also illustrating position of press.
Figure 13:
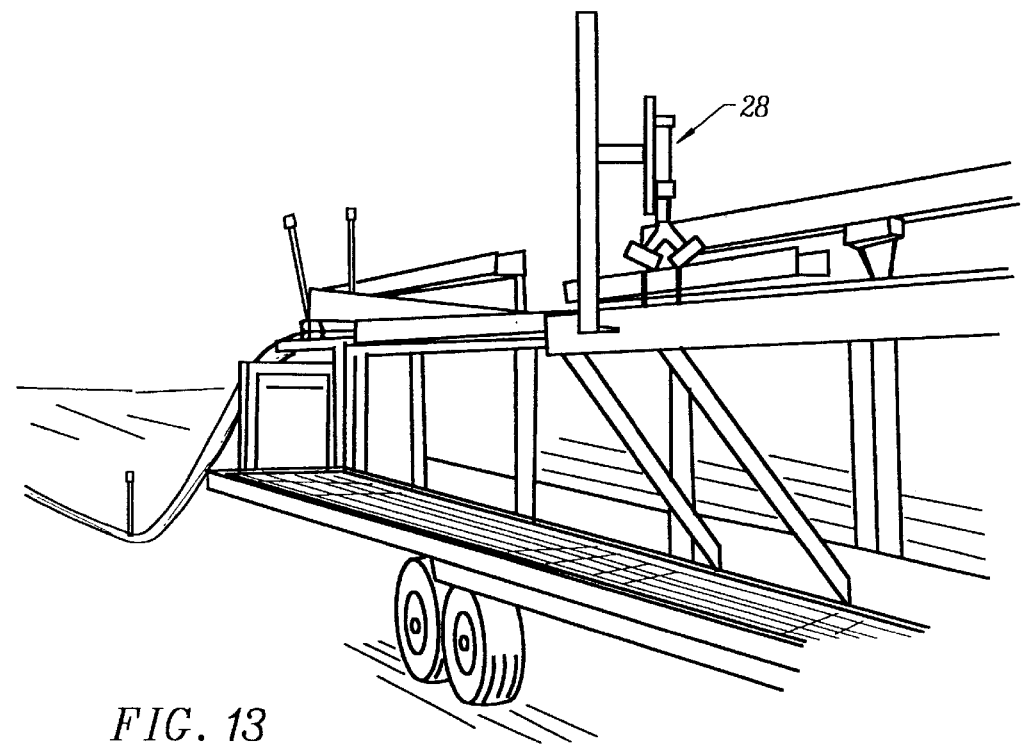

FIG. 13 (top) shows assembler AF loading a pipe into the primary chute 17. FIG. 13 (top) also shows a pipe moving forward in chute 2, 18 and one moving into the field in chute 3, 19. The pneumatic press is also shown in FIG. 12 (top). The man on the right is the right side installer. FIG. 13 (bottom) shows the Rear Assembler (RA) and Right Side Installer on the pneumatic press as pipe is being laid in the field.

Figure 14:
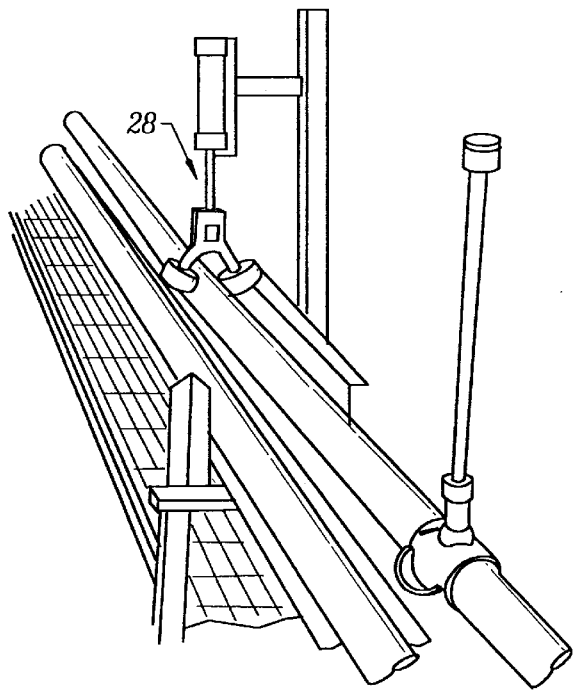
FIG. 14 illustrates pipe coupling process form top perspective by Right Side Installer (RSI).
Figure 14:
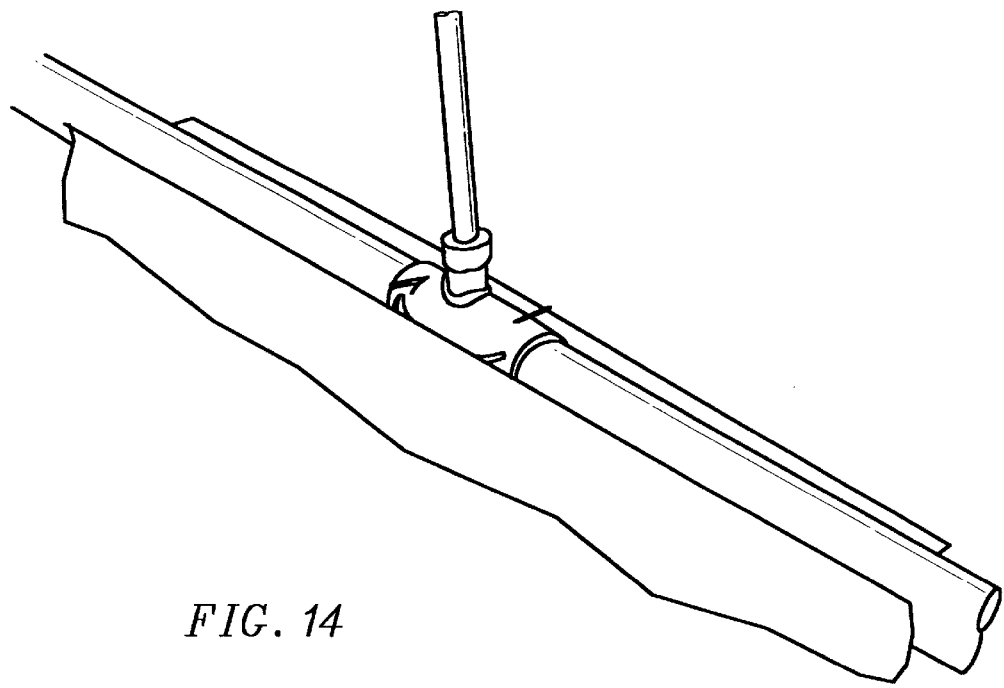

FIG. 14 (top) depicts the press 28 engaging the pipe against the belt while the right side installer (RSI) aligns the joints. The pipe which is presses onto the belt therefore overtakes the pipe which has been previously installed and FIG. 14 (bottom) shows the final assembly before the pipe enters the field.

Figure 15:
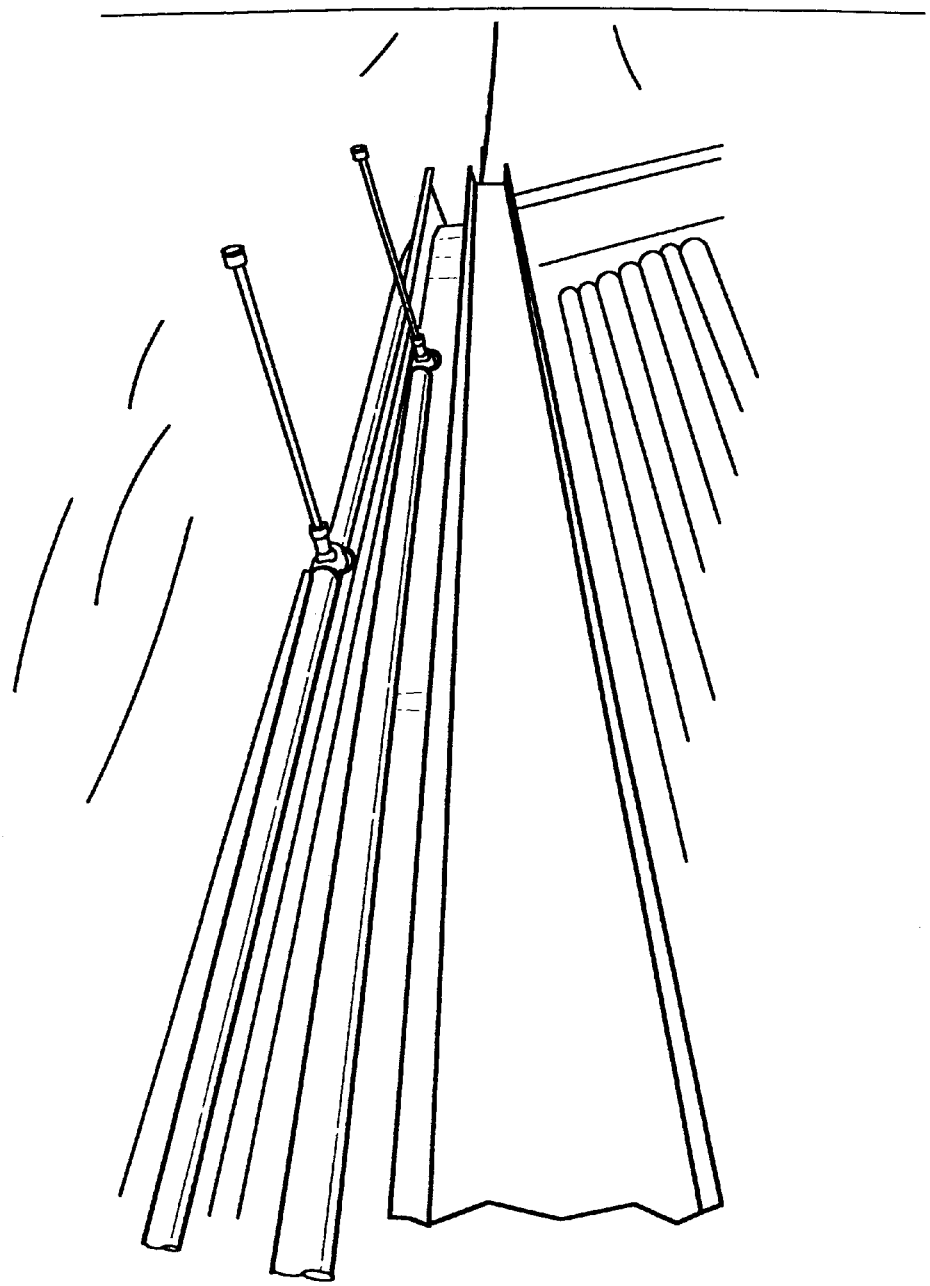
FIG. 15 is perspective from front of work station/trailer of final assembly and pipe placement.

FIG. 15 illustrates pipe moving in opposite direction as the platform.

Figure 16:
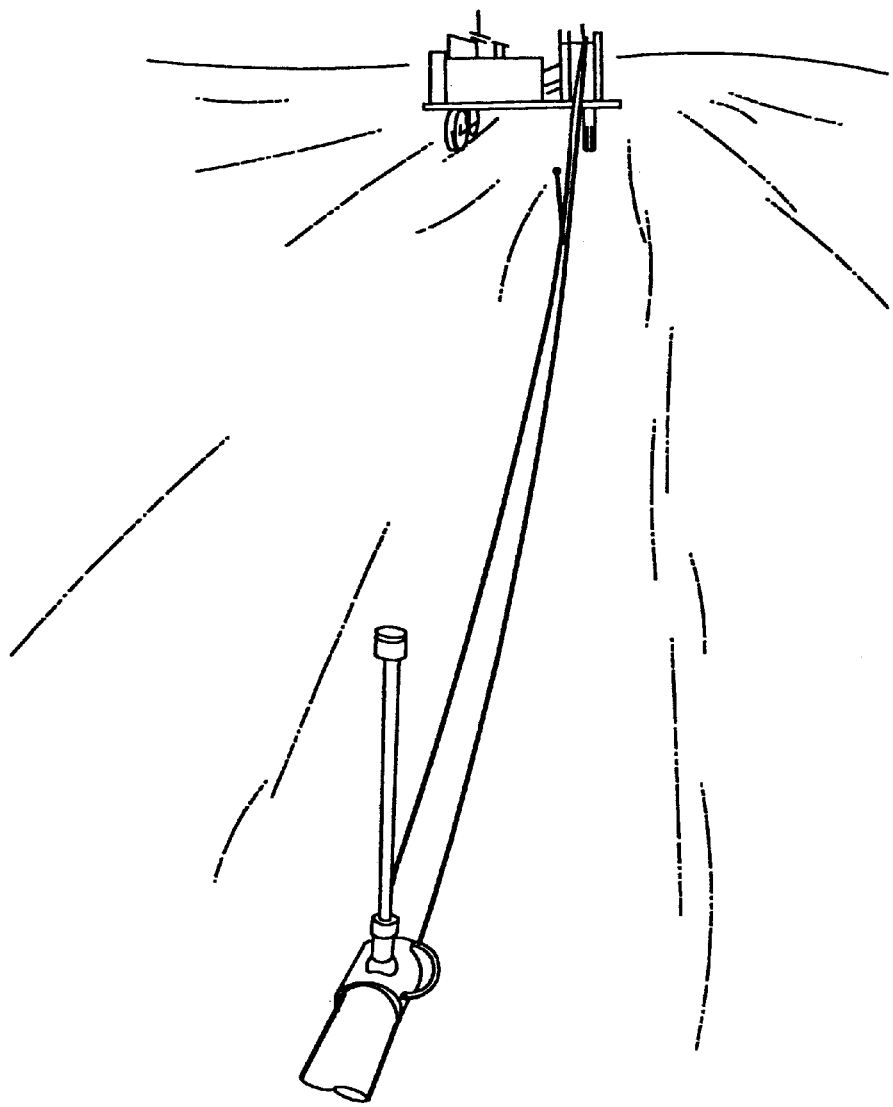
FIG. 16 is a rear perspective of the pipe laying process.

FIG. 16 is a rear view of the installation process.

Figure 17:
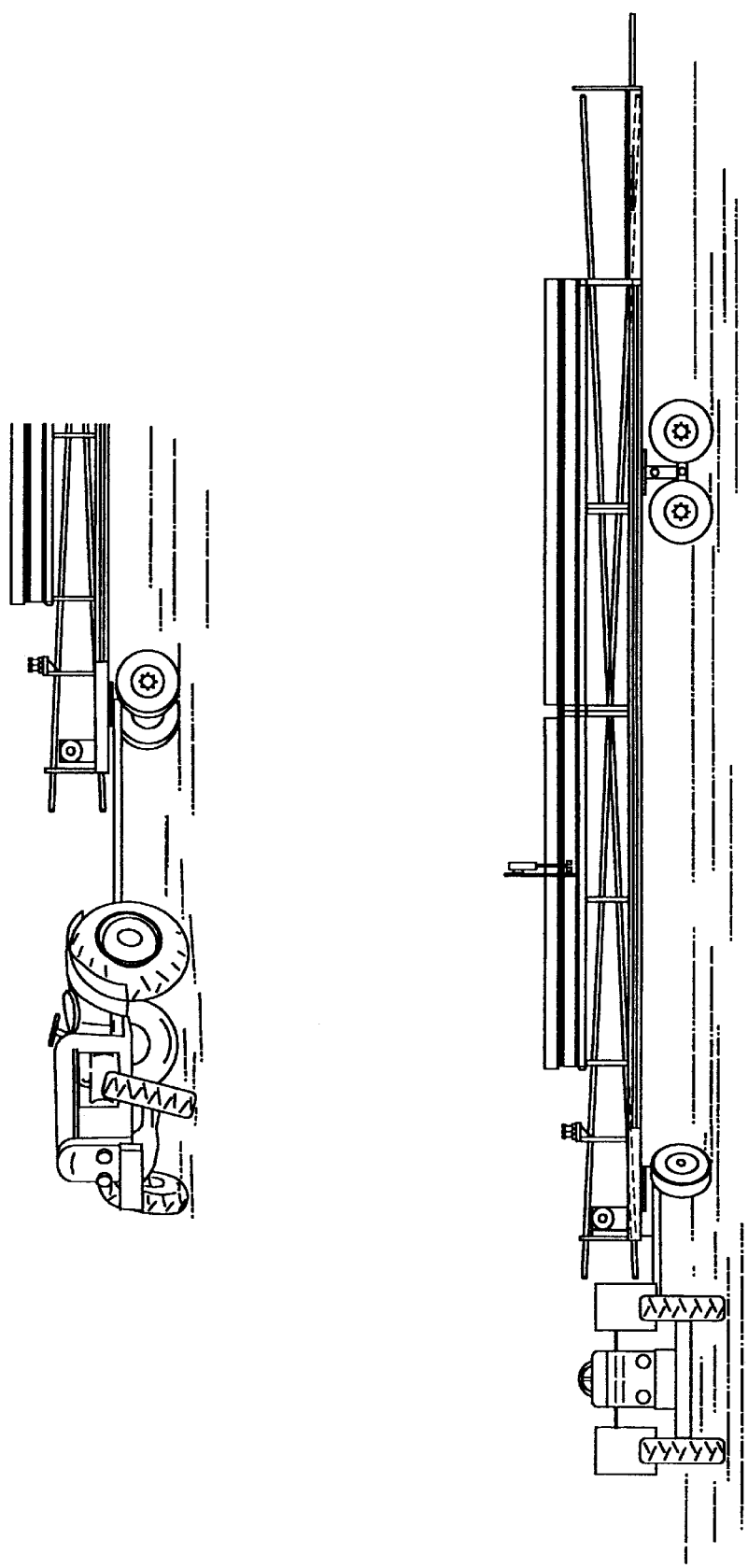
FIG. 17 is a side perspective illustrating independent axles.

FIG. 17 (top) depicts operations of the hydraulics which power the rear axle. FIG. 17 (bottom) depicts orientation of the axles as the platform finishes an installation of one line of pipe.

The Sprinkler Installation System Installation Procedure

FIGS. 8 through 17 provide illustrations showing installation according to the invention. As typical pipe installation process requires four workers for a single line assembly. One worker on the front platform is designated as the Front Assembler, another worker on the back platform is designated as the Rear Assembler, another worker on the catwalk is designated as the installer, and the fourth worker is designated as the driver/operator.

The process proceeds as follows:
1. The Front and Rear Assemblers load a pipe from the magazine into chute 1 and push the pipe against the forward stop while the Rear Assembler pushes a coupler onto this pipe and installs a locking spline.
2. The RA flips the pipe onto chute 2 which has a forward moving belt.
3. This first pipe travels in chute 2 to a position where the Installer flips it onto chute 3 which has a belt moving to the rear of the platform. RA and FA have by this time loaded a second pipe onto the belt in chute 2.
4. The Installer flips this second pipe onto the belt in chute 3 and engages the pneumatic press which speeds this second pipe up to the point that it joins the first pipe. The Installer then installs a second locking spline to attach the two points.
5. The driver starts the tractor/trailer forward at a speed that is conducive to the efficient and safe pipe installation.
6. As the trailer moves forward, the first two pipes are slid off of the platform into position in the field. At this point in the installation process, it is assumed that the material man has previously loaded and connected a third pipe assembly in the primary chute.
7. The third pipe is positioned relative to the free end of the second pipe by the helper and the assembly man and connected by the assembly man to the third pipe, while the helper and the material man load and assemble the fourth pipe.

The catwalks and sliding lever allows the assembly man to work and walk with the coupler positioned such that the tractor moves through the field at a constant speed. The position on the trailer at which the assembly man can connect the two pipes is therefore quite flexible.

The pipe is removed from the field by the outrigger to the front of the tractor and a reverse process is used to disassemble the pipe assembly.

Although the invention is described herein with reference to the preferred embodiment, one skilled in the art will readily appreciate that other applications may be substituted for those set forth herein without departing from the spirit and scope of the present invention. Accordingly the invention should only be limited by the claims included below.

What is claimed is:
1. A portable pipe installation and removal system, comprising:
   a movable platform having:
      a central magazine of a predetermined length to accommodate pipe of various lengths and cross sections;
      at least one work platform located at either end of said magazine for allowing workers to manipulate the pipe in said magazine;

at least one catwalk located on at least one side of said magazine for allowing the workers to walk safely and freely along the sides of said magazine; and at least two chutes located on said platform, said chutes comprising:
- a primary chute located closest to said magazine, wherein said primary chute is fitted with a fixed stop on a front end; and
- a secondary chute having a conveyer for assembly of pipe sections;
- wherein said chutes define work areas where the pipe sections are assembled or disassembled.

2. The system of claim 1, further comprising:

at least one outrigger at a rear of said platform for assisting in the accurate placement of the pipe in a field.

3. The system of claim 1, wherein said platform comprises:

a trailer that is either self propelled or pulled by a motorized vehicle.

4. The system of claim 1, said platform further comprising:

a wheeled chassis, wherein said platform is readily moved through a field during a pipe installation and removal.

5. The system of claim 1, wherein said conveyor effects joining of a first pipe section with a coupler and a second pipe section with a coupler.

* * * * *